US008934264B2

(12) United States Patent
Durfee et al.

(10) Patent No.: US 8,934,264 B2
(45) Date of Patent: Jan. 13, 2015

(54) INVERTED BASE BATTERY DISCONNECT UNIT

(71) Applicant: Cobasys, LLC, Orion, MI (US)

(72) Inventors: Jason A. Durfee, Troy, MI (US); Mark A. Niedzwiecki, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 13/626,993

(22) Filed: Sep. 26, 2012

(65) Prior Publication Data

US 2013/0301233 A1 Nov. 14, 2013

Related U.S. Application Data

(60) Provisional application No. 61/644,677, filed on May 9, 2012.

(51) Int. Cl.
*H05K 7/02* (2006.01)
*H05K 7/04* (2006.01)

(52) U.S. Cl.
USPC ........................................................ 361/807

(58) Field of Classification Search
USPC ............................ 361/679.01, 807; 307/10.7
See application file for complete search history.

(56) References Cited

U.S. PATENT DOCUMENTS

| | | | |
|---|---|---|---|
| 3,989,544 A | | 11/1976 | Santo |
| 4,798,968 A | * | 1/1989 | Deem .......................... 307/10.7 |
| 5,574,316 A | * | 11/1996 | Nieschulz .................... 307/10.7 |
| 6,111,327 A | * | 8/2000 | Bae .............................. 307/10.7 |
| 6,744,344 B2 | * | 6/2004 | Geuder et al. ................ 337/140 |
| 8,154,366 B2 | * | 4/2012 | Schmidt et al. ............... 335/126 |
| 2010/0047682 A1 | | 2/2010 | Houchin-Miller et al. |
| 2012/0251866 A1 | * | 10/2012 | Matejek et al. ............... 429/123 |
| 2013/0099765 A1 | * | 4/2013 | Girard et al. ................. 323/282 |

FOREIGN PATENT DOCUMENTS

| | | |
|---|---|---|
| DE | 19939987 C1 | 1/2001 |
| WO | 2009140277 A1 | 11/2009 |

OTHER PUBLICATIONS

International Search Report and Written Opinion corresponding to PCT Application No. PCT/US2013/040060, mailed Nov. 6, 2013 (10 Pages).

* cited by examiner

*Primary Examiner* — Bernard Rojas
(74) *Attorney, Agent, or Firm* — Maginot Moore & Beck LLP

(57) ABSTRACT

A battery disconnect unit (BDU) is arranged to selectively enable current flow between a power source and a battery pack of a vehicle, and between the battery pack and the vehicle. The battery disconnect unit includes a housing having an exterior and an interior, a first exterior surface and a first interior surface, and an opening opposite the first interior surface. A plurality of BDU components are mounted within the interior of the housing. The BDU components are mounted at least one of on and adjacent to the first interior surface of the housing, and respective fasteners used to mount the BDU components to the first interior surface of the housing are not exposed on the first exterior surface of the housing. When the housing is mounted on a mounting surface associated with the battery pack, the opening is arranged adjacent to the mounting surface and the first interior surface is arranged opposite the mounting surface relative to the opening.

17 Claims, 7 Drawing Sheets

INVERTED BASE BATTERY DISCONNECT UNIT

CROSS-REFERENCE TO RELATED APPLICATIONS

This application claims the benefit of U.S. Provisional Application No. 61/644,677, filed on May 9, 2012. The disclosure of the above application is incorporated herein by reference in its entirety.

FIELD

The present disclosure relates to battery disconnect units for vehicles including a battery pack.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEVs), electric vehicles (EVs), heavy duty vehicles (HDVs) and vehicles with 42-volt electrical systems. Exemplary stationary applications include backup power for telecommunications systems, uninterruptible power supplies (UPS), and distributed power generation applications.

A battery system may include a battery pack that includes one or more battery modules or subpacks that are connected in series and/or in parallel. Each of the battery modules may include one or more high-voltage battery cells that are electrically connected in parallel and/or in series and mechanically linked together to form a self-supporting assembly. Example battery cells include nickel metal hydride (NiMH) cells, lead-acid cells, lithium ion cells, and other types of battery cells.

Referring now to FIGS. 1A and 1B, the battery system may include a battery disconnect unit (BDU) 100 arranged between the battery pack and a battery charger or other components of the vehicle. The BDU 100 includes a housing 104 including a base portion 108 and a cover portion 112. The housing 104 including the base portion 108 and the cover portion 112 may be formed (e.g., molded or stamped) using plastic or another suitable electrically insulative material. The housing 104 encloses one or more components 116 arranged within the base portion 108. For example, the components 116 are mounted to the base portion 108 using one or more fasteners 120 that pass through the base portion 108 to secure respective ones of the components 116. For example only, the fasteners 120 may include bolts that pass through openings in the base portion 108 to connect to respective openings in the components 116. The cover portion 112 is secured to the base portion 108 to enclose the components 116 within the housing 104. The housing 104 is secured to the vehicle (e.g., within the battery system) via mechanical connection between the base portion 108 and a suitable structure of the vehicle.

SUMMARY

A battery disconnect unit (BDU) is arranged to selectively enable current flow between a power source and a battery pack of a vehicle, and between the battery pack and the vehicle. The battery disconnect unit includes a housing having an exterior and an interior, a first exterior surface and a first interior surface, and an opening opposite the first interior surface. A plurality of BDU components are mounted within the interior of the housing. The BDU components are mounted at least one of on and adjacent to the first interior surface of the housing, and respective fasteners used to mount the BDU components to the first interior surface of the housing are not exposed on the first exterior surface of the housing. When the housing is mounted on a mounting surface associated with the battery pack, the opening is arranged adjacent to the mounting surface and the first interior surface is arranged opposite the mounting surface relative to the opening.

A method of assembling a battery disconnect unit (BDU) to selectively enable current flow between a power source and a battery pack of a vehicle, and between the battery pack and the vehicle, includes molding a housing having an exterior and an interior, a first exterior surface and a first interior surface, and an opening opposite the first interior surface, mounting a plurality of BDU components within the interior of the housing, wherein the BDU components are mounted at least one of on and adjacent to the first interior surface of the housing, and wherein respective fasteners used to mount the BDU components to the first interior surface of the housing are not exposed on the first exterior surface of the housing, and mounting the housing on a mounting surface associated with the battery pack. The opening is arranged adjacent to the mounting surface and the first interior surface is arranged opposite the mounting surface relative to the opening.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
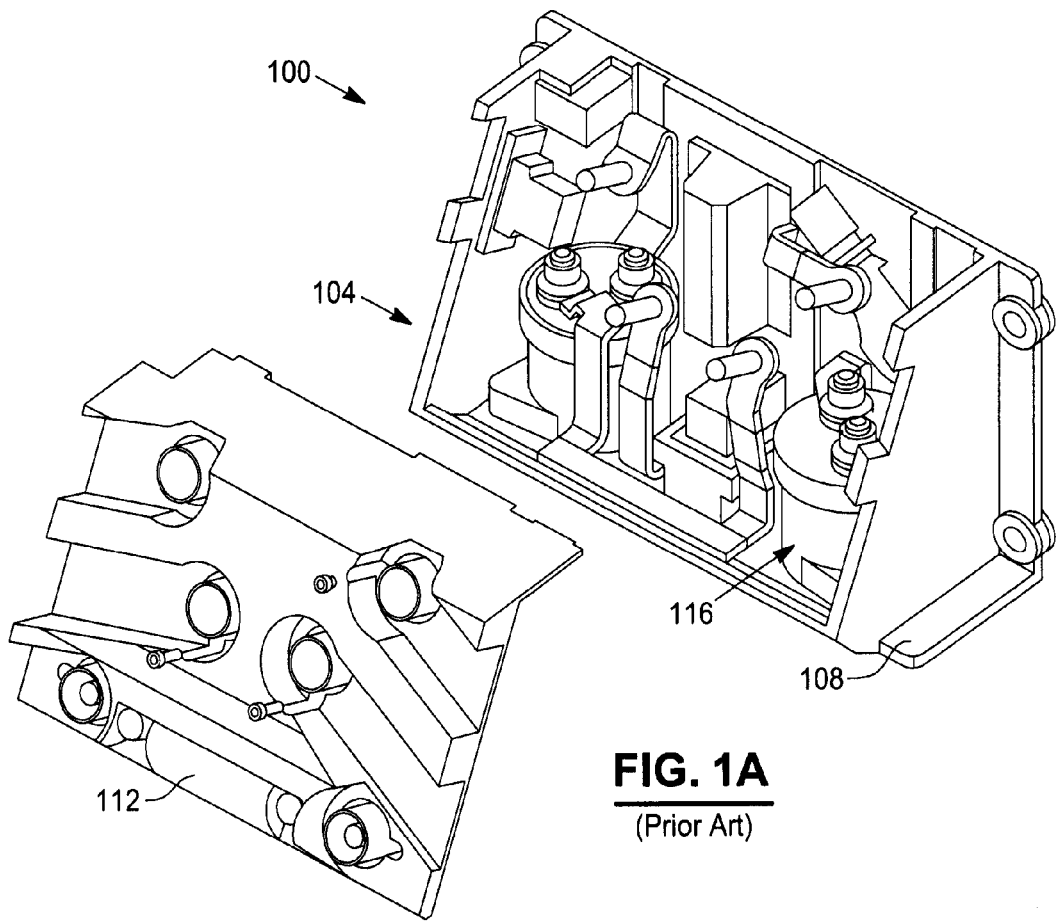
FIGS. 1A and 1B illustrate a battery disconnect unit according to the prior art.
Figure 1B:
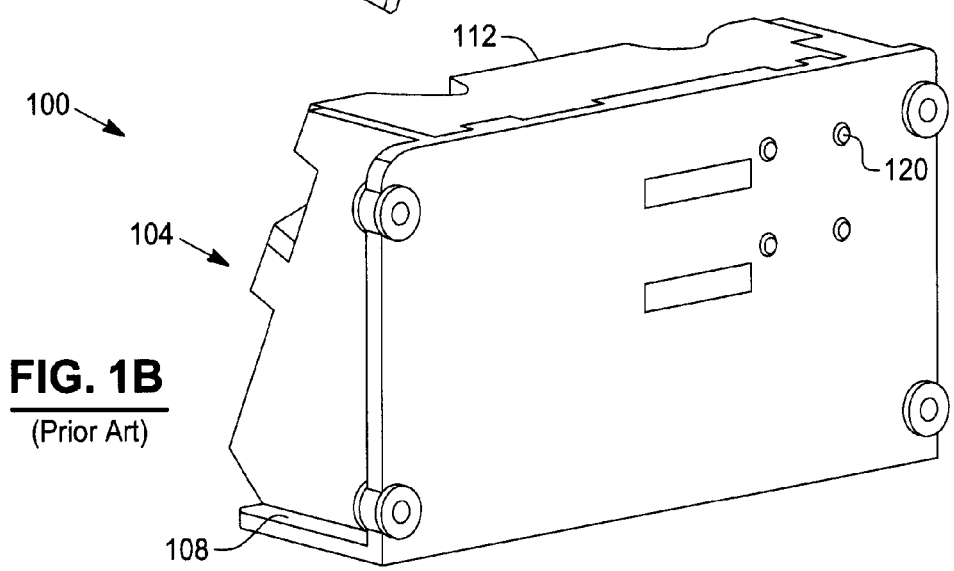
Figure 2:
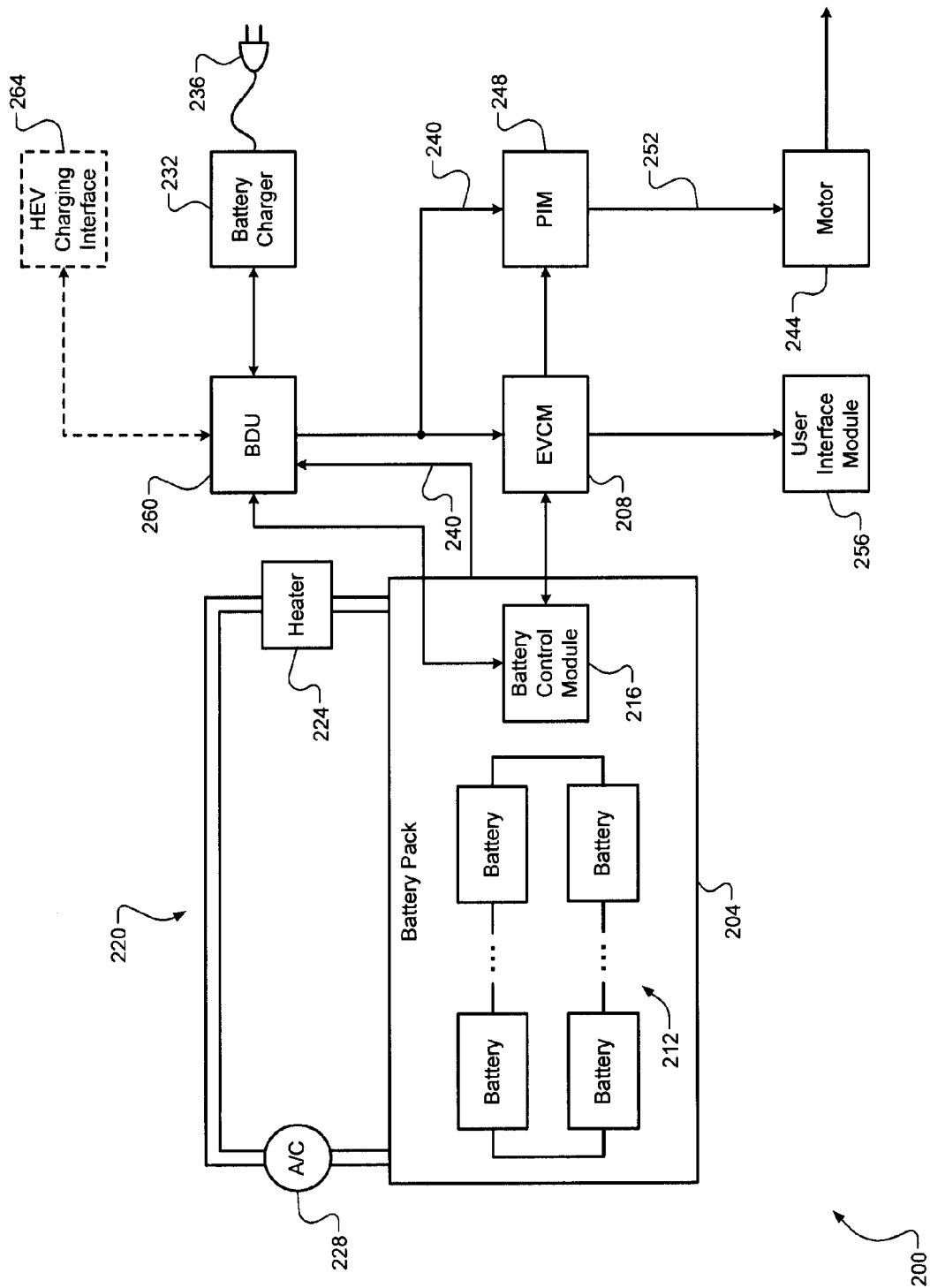
FIG. 2 is a functional block diagram of an electric vehicle including a battery pack and a battery disconnect unit (BDU) according to the principles of the present disclosure.
Figure 3A:
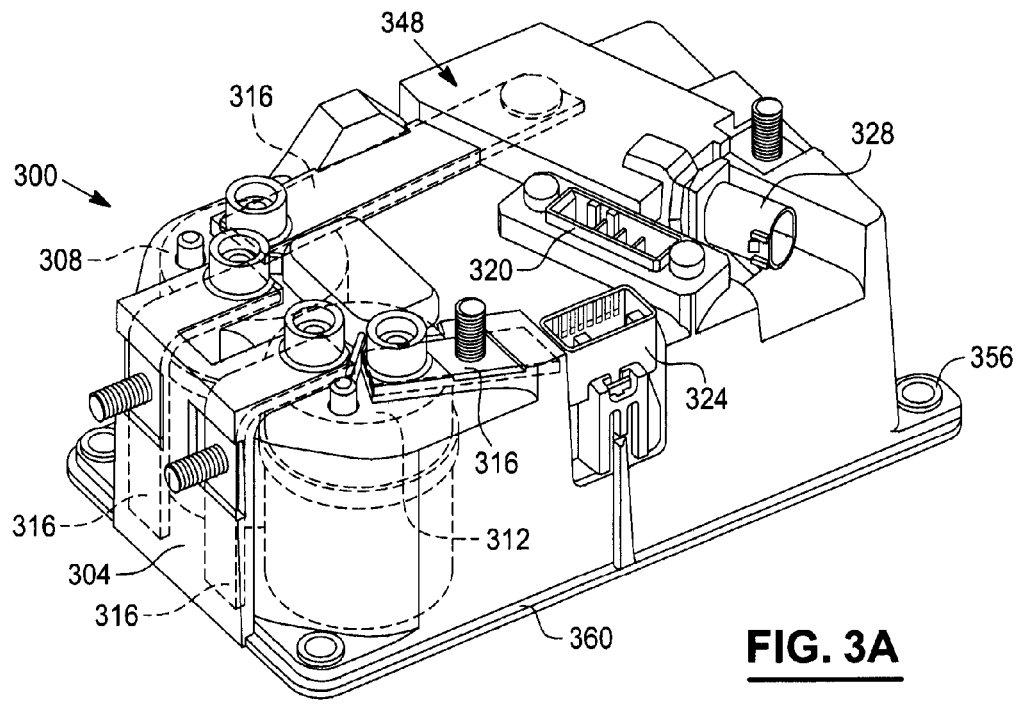
FIGS. 3A, 3B, 4A, and 4B illustrate a BDU having an inverted base according to the principles of the present disclosure.
Figure 3B:
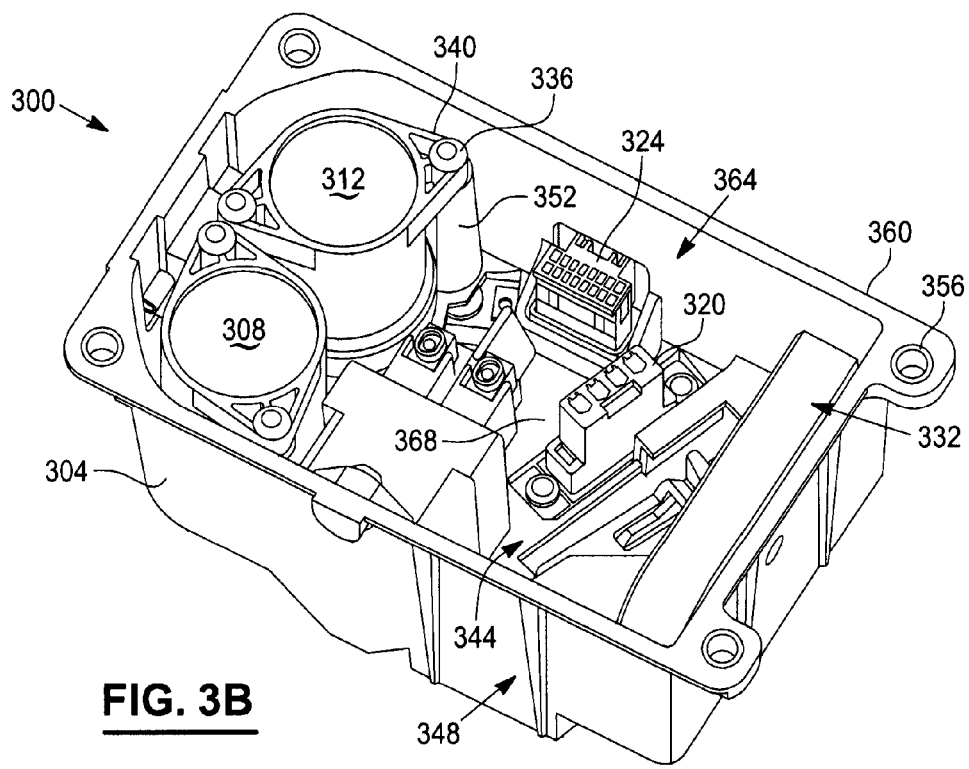
Figure 4A:
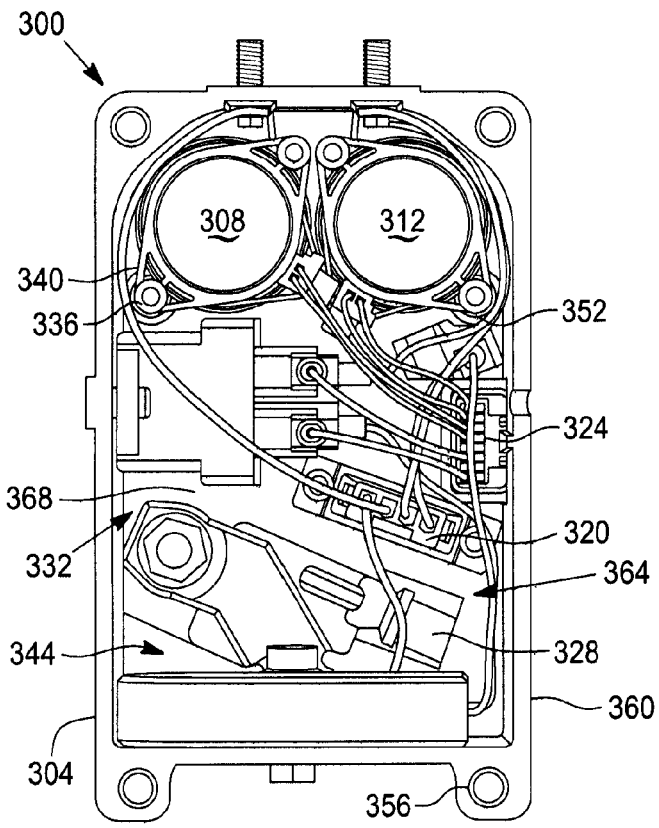
Figure 4B:
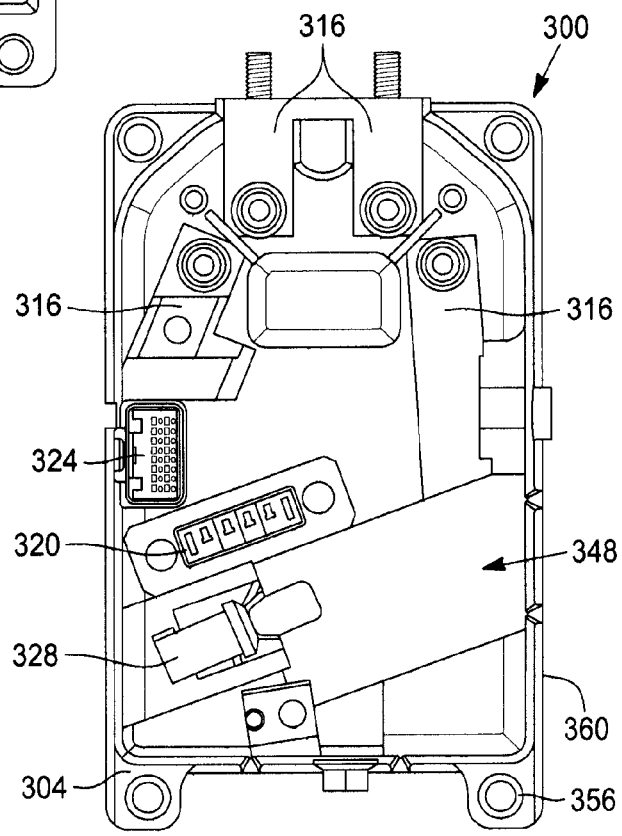

Referring now to FIG. 2, an electric vehicle 200 includes a battery pack 204 and an electric vehicle control module (EVCM) 208. The battery pack 204 includes one or more battery modules 212, each including one or more battery cells, and a battery control module 216. The battery control module 216 controls various functions of the battery pack 204 and monitors and collects various characteristics of the battery pack 204. For example, the battery control module 216 monitors characteristics including, but not limited to, a voltage, a current, and a temperature associated with the battery pack 204. The battery control module 216 may determine performance variables of the battery pack 204 based on the characteristics. For example only, the battery control module 216 may estimate a state of charge (SOC) of the battery pack 204 based on the voltage, current, and temperature of the battery pack 204.

The battery control module 216 may initiate heating and/or cooling of the battery pack 204 based on the temperature. For example, a coolant system 220 may provide liquid coolant that flows through the battery pack 204 to heat and cool the battery pack 204. The coolant system 220 may include a heater 224 that heats the coolant when the temperature of the battery pack 204 is less than a low temperature threshold, and an air conditioner/compressor 228 that cools the coolant when the temperature of the battery pack 204 is greater than a high temperature threshold.

The battery control module 216 communicates with battery charger 232. The battery charger 232 charges the battery pack 204 and may include a user interface (not shown) for providing visual indications of the condition of the battery pack 204 (e.g., the SOC of the battery pack 204). The battery charger 232 includes a plug 236 that interfaces with a power source (not shown) to provide charging power to the battery pack 204 via the battery charger 232.

The EVCM 208 communicates with the battery pack 204 and the battery control module 216 to control various functions of the vehicle 200. For example, the EVCM 208 receives a voltage 240 from the battery pack 204. Conversely, the EVCM 208 receives information from the battery control module 216 related to, for example only, the monitored characteristics of the battery pack 204 and functions of the battery control module 216, the coolant system 220, and the battery charger 232.

The EVCM 208 controls a motor 244 of the vehicle 200 via a power inverter module (PIM) 248. The PIM 248 converts a direct current (DC) voltage (e.g., the voltage 240) to an alternating current (AC) voltage 252 and provides the AC voltage 252 to the motor 244. The motor 244 provides rotational force to drive wheels (not shown) of the vehicle 200. The EVCM 208 may communicate with a user interface module 256 to indicate a status of the vehicle 200 (e.g., a status of the battery pack 204). For example, the user interface module 256 may indicate that the vehicle 200 should be plugged in to charge the battery pack 204.

The electric vehicle 200 includes a battery disconnect unit (BDU) 260. The BDU 260 is arranged in a current path between the battery pack 204 and the battery charger 232, and between the battery pack 204 and, for example, the EVCM 208 and the PIM 248. More specifically, the BDU 260 is arranged to selectively allow and interrupt current flow from the battery charger 232 to the battery pack 204. Further, the BDU 260 is arranged to selectively allow and interrupt current flow from the battery pack 204 to other components of the vehicle 200. For example, the BDU 260 may include respective connectors (not shown) for interfacing with the battery charger 232 and the battery pack 204, and one or more sets of contactors (not shown) that may be selectively opened to interrupt current flow and closed to allow current flow. Although the BDU 260 is schematically shown arranged between the battery charger 232 and the battery pack 204, the BDU 260 according to the principles of the present disclosure may be mounted on or proximate to the battery pack 204.

Further, although the vehicle 200 is shown as an electric vehicle, the vehicle 200 may also include a hybrid electric vehicle (HEV). Accordingly, if the vehicle 200 is an HEV, the vehicle 200 may not include a battery charger 232 and instead may include an HEV charging interface 264. For example only, the HEV charging interface 264 may interface with one or more of an onboard charger, an auxiliary charger, a vehicle drivetrain (e.g., components associated with regenerative braking), and/or other suitable charging components associated with an HEV.

Referring now to FIGS. 3A, 3B, 4A, and 4B, a battery disconnect unit (BDU) 300 according to the principles of the present disclosure includes an inverted base (i.e., housing) 304. The inverted base 304 encloses components including, but not limited to, one or more contactors 308 and 312 and associated bus bars 316, a high voltage connector 320, a low voltage connector 324, and a current sensor (e.g., a shunt current sensor) 328, referred to collectively as components 332. For example only, the battery control module 216 may communicate with the BDU 300 using control signals via the low voltage connector 324. Conversely, the battery control module 216 may monitor characteristics of the BDU 300 (e.g., voltage and current characteristics) via the high voltage connector 320 and the current sensor 328. The inverted base 304 is formed (e.g., molded as a single integrated piece) from an electrically insulative material.

Each of the components 332 is secured to the inverted base 304 using fasteners (e.g., bolts or screws) 336 that pass through respective molded retaining members 340 associated with each of the components 332 and into the base 304. More specifically, the fasteners 336 secure the components 332 from within an interior 344 of the base 304 without extending through the base 304. Accordingly, the fasteners 336 may not be exposed (e.g., visible or touchable) on an exterior 348 of the base 304. For example only, the interior 344 of the base 304 may include one or more threaded bosses 352 configured to receive the fasteners 336 to secure the components 332. The base 304 may be secured to a suitable structure within the vehicle (e.g., the battery pack) using suitable fasteners passed through openings 356 in the base 304. In this manner, any metallic components such as the fasteners 336 are retained within the interior 344 of the base 304.

A rim 360 of the inverted base 304 defines an opening 364 of the inverted base 304. For example, the opening 364 is located opposite the components 332 mounted within the inverted base 304. For example only, the opening 364 may correspond to a side of the inverted base 304 that is opposite an interior surface 368 that the components 332 are mounted to.

Figure 5:
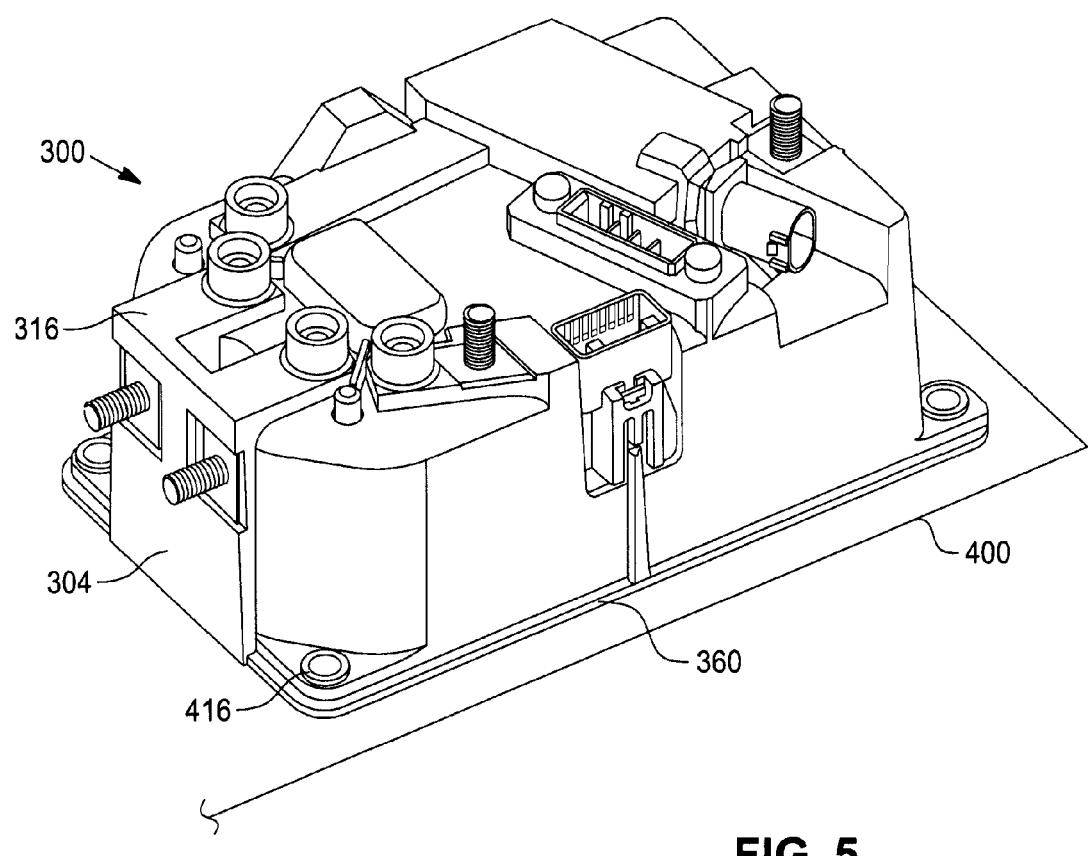
FIGS. 5 and 6 illustrate the BDU secured to a base plate of a battery pack according to the principles of the present disclosure.
Figure 6:
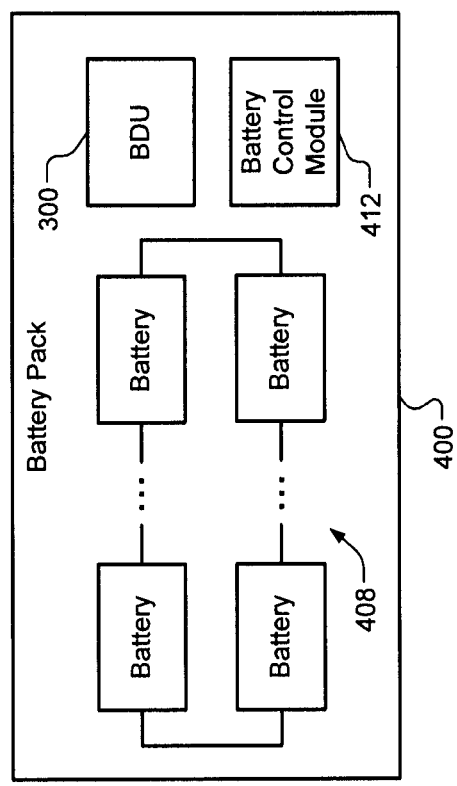

Referring now to FIGS. 5 and 6, the BDU 300 is shown secured to a mounting surface such as a base plate 400 of a battery pack 404. For example, one or more battery modules 408, a battery control module 412, and the BDU 300 may be mounted on the base plate 400. Because the components 332 are retained within the interior of the BDU 300 and the inverted base 304 is secured directly to the base plate 400 (e.g., using fasteners 416), an additional lid or cover to enclose the components 332 within the base 304 is not necessary. In other words, the base 304 functions to retain the components 332 within the BDU 300, enclose the components 332 without the use of a cover, and secure the BDU 300 to the base plate 400. Further, the bus bars 316 may be integrally molded within the inverted base 304, reducing the need for additional insulative coatings on the bus bars 316. Accordingly, cost, weight, and volume of the BDU 300 is reduced, and assembly of the components within the BDU 300 and attachment of the BDU 300 to the base plate 400 are simplified.

For example only, the components 332 are mounted on and/or adjacent to a first internal surface of the BDU 300. When the BDU 300 is inverted and mounted on the base plate 400, the first internal surface of the BDU 300 is above and opposite to a surface of base plate 400. Accordingly, the components 332 are retained, for example, against the first internal surface of the BDU 300 above and spaced apart from the base plate 400. For example, there may be no direct physical contact between the components 332 and the base plate 400, and the components 332 are not mounted on an interior surface of the BDU 300 that is in direct contact with the base plate 400. Further, there is no additional cover or enclosing structure between the BDU 300 and the base plate 400. Instead, the only contact between the BDU 300 and the base plate 400 may be via the rim 360 of the BDU 300.

Figure 7:
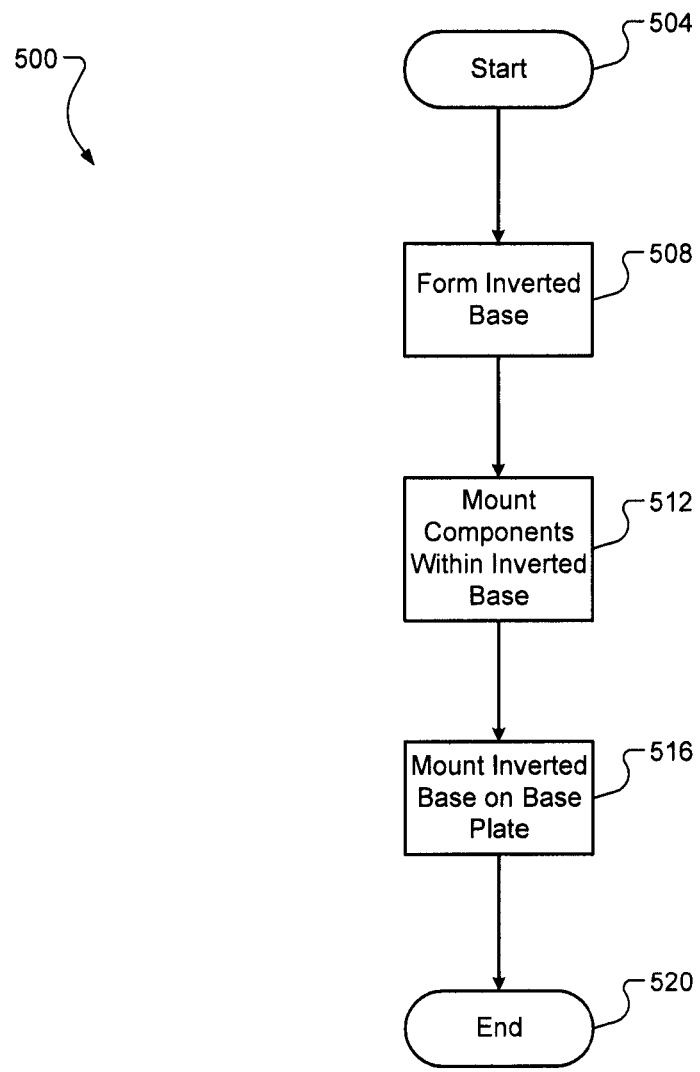
FIG. 7 illustrates a method of assembling a battery disconnect unit according to the principles of the present disclosure.

Referring now to FIG. 7, a method 500 of assembling a BDU begins at 504. At 508, an inverted base having integrally molded bus bars housing is formed (e.g., molded from plastic). At 512, components of the BDU are mounted within the inverted base on and/or adjacent to an internal surface of the BDU. For example only, fasteners may be used to retain the components from within the interior of the BDU. At 516, the inverted base is mounted to a base plate of a battery pack such that the components of the BDU are arranged above and spaced apart from the base plate on an internal surface of the inverted base. The method 500 ends at 520.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

What is claimed is:

1. A battery disconnect unit (BDU) that is arranged to selectively enable current flow between a power source and a battery pack of a vehicle, and between the battery pack and the vehicle, the battery disconnect unit comprising:
   a housing having an exterior and an interior, a first exterior surface and a first interior surface, and an opening opposite the first interior surface;
   a plurality of first fasteners; and
   a plurality of BDU components, each of the plurality of BDU components mounted within the interior of the housing using a respective one of the plurality of first fasteners, wherein the BDU components are mounted at least one of on and adjacent to the first interior surface of the housing,
   wherein none of the plurality of first fasteners extend through the first exterior surface of the housing,
   wherein each of the plurality of first fasteners are positioned in the interior of the housing after the respective one of the plurality of BDU components is positioned in the interior of the cavity, and extend from the interior of the housing toward the first interior surface of the housing, and
   wherein when the housing is mounted on a mounting surface associated with the battery pack, the opening is arranged adjacent to the mounting surface and the first interior surface is arranged opposite the mounting surface relative to the opening.

2. The BDU of claim 1, wherein the housing includes a rim that defines the opening, and the housing is mounted to the mounting surface using a plurality of second fasteners inserted through corresponding fastener openings in the rim.

3. The BDU of claim 1, wherein the housing includes at least one bus bar integrally molded within the housing.

4. The BDU of claim 1, wherein the interior of the housing includes at least one threaded boss, and wherein at least one of the BDU components is mounted within the interior of the housing via the respective one of the plurality of first fasteners and the at least one threaded boss.

5. The BDU of claim 1, wherein the BDU components include at least one of contactors, bus bars, a high voltage connector, a low voltage connector, and a current sensor.

6. The BDU of claim 1, wherein the housing is molded from an electrically insulative material.

7. The BDU of claim 1, wherein the housing does not include a cover arranged between the opening and the mounting surface.

8. The BDU of claim 1, wherein the mounting surface corresponds to a base plate, and the battery pack and the BDU are mounted on the base plate.

9. A vehicle comprising:
   the BDU of claim 1; and
   a battery pack.

10. A method of assembling a battery disconnect unit (BDU) to selectively enable current flow between a power source and a battery pack of a vehicle, and between the battery pack and the vehicle, the method comprising:
   forming a housing having an exterior and an interior, a first exterior surface and a first interior surface, and an opening opposite the first interior surface;
   mounting a plurality of BDU components within the interior of the housing, each of the plurality of BDU components mounted using a respective one of a plurality of first fasteners inserted through the opening, wherein the BDU components are mounted at least one of on and adjacent to the first interior surface of the housing, wherein each of the plurality of first fasteners extend from the interior of the housing toward the first interior surface of the housing,
   and wherein the respective ones of the plurality of first fasteners used to mount the BDU components to the first interior surface of the housing do not extend through the first exterior surface of the housing when the plurality of BDU components are mounted within the interior of the housing; and mounting the housing on a mounting surface associated with the battery pack, wherein the opening is arranged adjacent to the mounting surface and the first interior surface is arranged opposite the mounting surface relative to the opening.

11. The method of claim 10, wherein the housing includes a rim that defines the opening, and the housing is mounted to the mounting surface using a plurality of second fasteners inserted through corresponding fastener openings in the rim.

12. The method of claim 10, further comprising integrally molding at least one bus bar within the housing.

13. The method of claim 10, wherein the interior of the housing includes at least one threaded boss, and wherein at least one of the BDU components is mounted within the interior of the housing via the respective one of the plurality of first fasteners and the at least one threaded boss.

14. The method of claim 10, wherein the BDU components include at least one of contactors, bus bars, a high voltage connector, a low voltage connector, and a current sensor.

15. The method of claim 10, wherein the housing is molded from an electrically insulative material.

16. The method of claim 10, further comprising mounting the housing to the mounting surface without arranging a cover arranged between the opening and the mounting surface.

17. The method of claim 10, wherein the mounting surface corresponds to a base plate, and the battery pack and the BDU are mounted on the base plate.

* * * * *